July 5, 1932.                    E. C. TAYLOR                    1,865,650
           BEAD CLOSING MECHANISM FOR TIRE WRAPPING MACHINES
                    Filed Aug. 12, 1927         3 Sheets-Sheet 2

INVENTOR.
Edward C. Taylor

July 5, 1932. E. C. TAYLOR 1,865,650
BEAD CLOSING MECHANISM FOR TIRE WRAPPING MACHINES
Filed Aug. 12, 1927 3 Sheets-Sheet 3

INVENTOR.
Edward C. Taylor

Patented July 5, 1932

1,865,650

UNITED STATES PATENT OFFICE

EDWARD C. TAYLOR, OF LONGMEADOW, MASSACHUSETTS, ASSIGNOR TO THE FISK RUBBER COMPANY, OF CHICOPEE FALLS, MASSACHUSETTS, A CORPORATION OF MASSACHUSETTS

BEAD CLOSING MECHANISM FOR TIRE WRAPPING MACHINES

Application filed August 12, 1927. Serial No. 212,366.

This invention relates to machines for wrapping pneumatic tire casings or similar articles with a helical covering, generally of paper. In present machines of this general character it is customary to provide mechanisms for closing together the bead portions or inner edges of the tire in advance of the application of the paper in order to make a tighter package. In machines available at the present time, however, it is necessary to adjust the position of the bead closing mechanism whenever a change is made in the size of the tire placed in the machine for wrapping. It is the object of my invention to provide a bead closing mechanism which will automatically adjust itself to a tire placed in the machine, whatever may be the size of the tire. A further object of my invention is to provide a mechanism which will close the bead of a tire a predetermined amount irrespective of the size of the tire placed in the machine.

Referring to the drawings.

Figure 1:
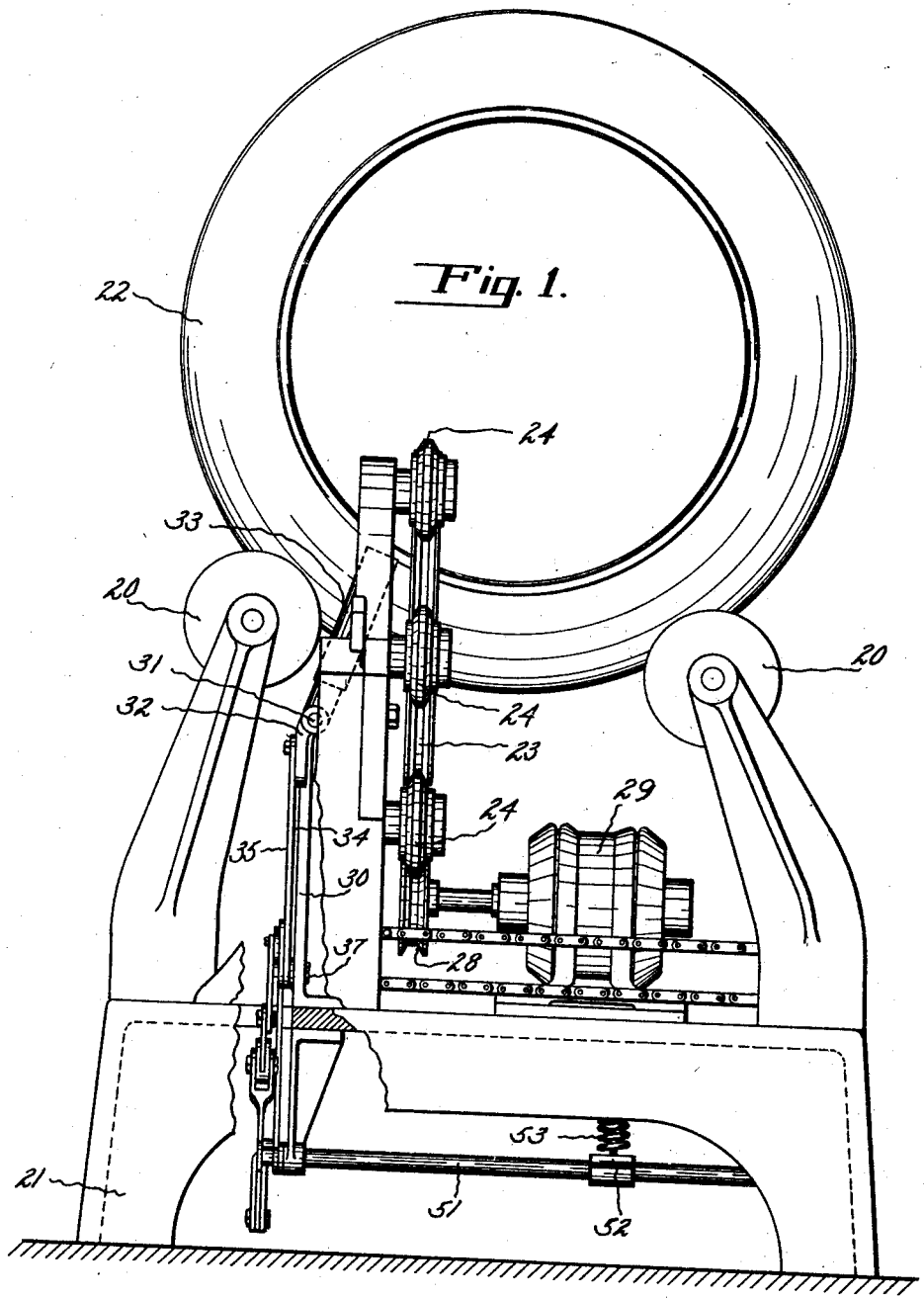
Fig. 1 is a front elevation of a wrapping machine embodying my invention, portions of the mechanism not related to the bead closing function being illustrated only generally, as the invention is shown as applied to a machine of a standard type.

The tire wrapping machine to which my invention has been applied is here illustrated as a conventional type in which rolls 20 for supporting and driving the tire are mounted in a frame 21. The tire 22 is generally held in a vertical position by other rolls at the top which are not here shown. A shuttle 23 is mounted for rotation in rolls 24 spaced about its circumference, these rolls being journaled in a shuttle carrier 25 joined to the frame upon a pivot 26. A counterbalancing spring 27 may be used for convenience in adjusting the position of the shuttle carrier. The paper supplying mechanism on the shuttle has not been illustrated in the present case as it does not affect the operation of my invention. In order to rotate the pulley one of the rolls 24 may be driven from a friction pulley 28 upon the shaft of a motor 29.

The bead closing mechanism forming my present invention is mounted upon a pedestal 30 arising from the frame 21. At the upper end of this pedestal are mounted rods 31 extending from the pedestal on either side. Freely reciprocating upon these rods are slides 32 carrying rotatable tire engaging members 33 which when pressed together serve to close the beads of the tire. Arms 34 and 35 are pivoted at 36 and 37, respectively, to the pedestal and carry at their upper ends slots 38 in which run studs 39 secured to the slides 32. A spring 40 constantly urges the two slides and consequently the tire engaging members 33 towards the sides of the tire. This spring, however, is of insufficient force to close the beads of the tire by itself.

Secured to arms 34 and 35, respectively, are arms 41 and 42, the former carrying a pin 43 passing through a slot 44 in the latter so that the arms and therefore the tire engaging members 33 always move simultaneously in opposite directions. Arm 34 is keyed to the pivot 36 at 45 and also keyed to this pivot is an arm 46 having a stud 47 at its outer end. This stud runs in a slot 48 in a link 49 pivoted at its lower end to an arm 50 keyed upon a shaft 51. Likewise keyed to this shaft is a treadle 52 which is drawn upwardly by a spring 53. In commercial machines of this character a second treadle is sometimes provided which forms an interlock for treadle 52 preventing its upward motion during the running of the machine and permitting its release by the depression of this second treadle so that the operator does not have to maintain his foot upon the treadle 52 throughout the operation of the machine. The treadle 52 may also be used for the starting mechanism of the wrapping machine. These other features, however, have not been illustrated as they form no part of my invention and are not necessary for a complete understanding thereof. For the purpose of the present invention the treadle may be considered as actuating only the bead closers.

Figure 3:
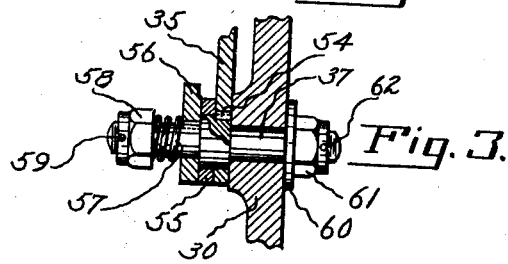
Fig. 3 is a section on line 3—3 of Fig. 2.
Figure 4:
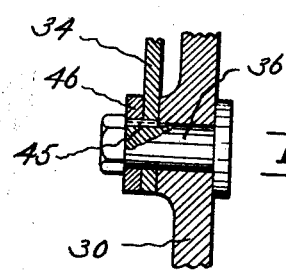
Fig. 4 is a section on line 4—4 of Fig. 2.

The arm 35 is keyed as at 54 (see Fig. 3) to the pivot 37. Mounted for free rotation upon this pivot is a pawl carrier 55 and keyed to this pivot is a segmental ratchet 56. This ratchet and the arm 35 always move in unison while the pawl carrier is free to rotate except as restrained by the friction of the parts. Means are preferably provided to insure a slight friction in order to insure the actuation of other devices to be described. In the present case a spring 57 is mounted between the ratchet 56 and a nut 58 which is held in position upon the pivot by a pin 59. The ratchet, while keyed to the pivot, is free to slide thereon and is consequently pressed against the rotatable pawl carrier 55 by the spring, insuring even friction at all times. The pivot 37 is conveniently secured to the pedestal by a collar 60 held in position by a nut 61 which is pinned to the pivot as at 62. This construction permits the pivot to rotate as required by the movement of arm 35.

A pawl 63, made in the form of a bell crank, is pivoted at 64 to the pawl carrier, the latter being provided with stops 65 and 66 to limit the movement of the pawl in either direction. The pawl is pivoted at 67 to a link 68 pivoted in turn to a lever 70 mounted at 71 upon a bracket 72. A sliding block 73 is mounted upon the lever 70 and is held in position by set screws 74. This block bears a pivot 75 by which the levers may be connected to a link 76 pivoted at 77 to a crank 78 upon the shaft 51. By adjusting the position of the block 73 the amount of throw of the pawl carrier may be regulated.

Figure 2:
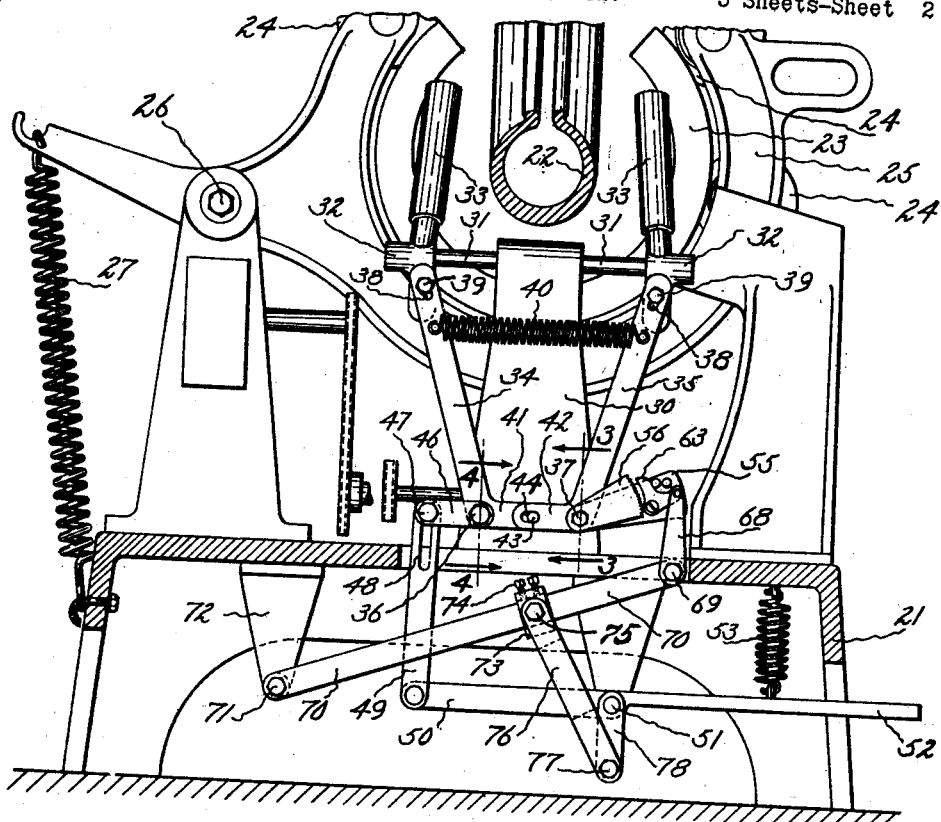
Fig. 2 is a partial side elevation of this machine illustrating the mechanism of my invention applied in place.
Figure 6:
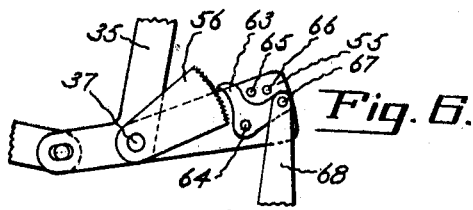
Fig. 6 is an enlarged detail of parts shown in Fig. 5.
Figure 8:
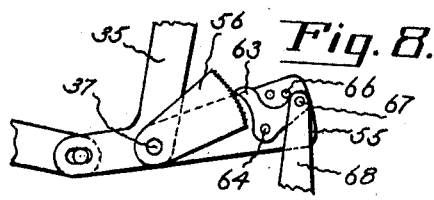
Fig. 8 is an enlarged detail corresponding to Fig. 7.
Figure 5:
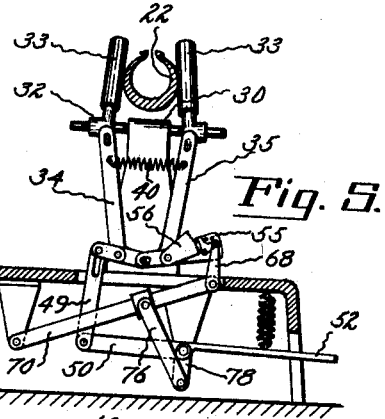
Fig. 5 is a diagrammatic view corresponding to Fig. 2, showing an intermediate stage in the application of the bead closing mechanism.
Figure 7:
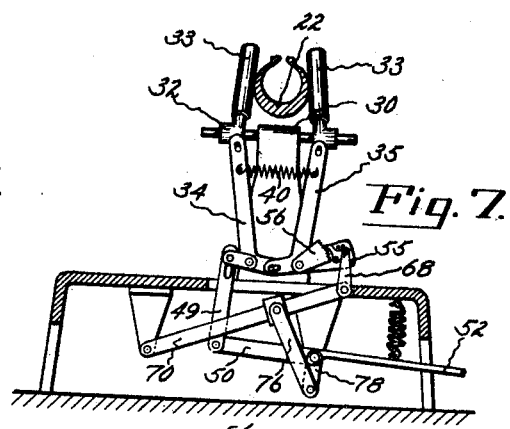
Fig. 7 is a view similar to Fig. 5 showing a slightly subsequent stage in the operation of the mechanism.

The operation of the mechanism will now be considered. Assuming the parts to be in the position of Fig. 2 in which the bead closing members 33 are spaced rather widely apart, a tire 22 is put in position upon the roll 20, the paper upon the shuttle 23 is made ready for the wrapping operation and the treadle 52 is then depressed. While this latter operation normally occurs practically instantaneously the descent of the treadle will here be considered in detail to study the progression of the various operations occurring. At the very start of the depression of the treadle the link 49 is raised, permitting the spring 40 to draw the arms 34 and 35 together. When the members 33 contact with the tire the motion of the arms stops but the link 49, by reason of the pin and slot connection which is made with the arm 46, continues to rise without affecting the position of the members 33. Due to the fact that the initial positions of the crank 78 and link 76 are practically upon the center line of shaft 51 very little upward movement of the lever 70 occurs during this period. The pawl carrier 55 being frictionally connected with arm 35, it moves with the arm as much as is permitted by the link 68 which, through pawl 63 and stop 65, restrains the pawl carrier from upward movement. The pawl 63, however, is ultimately moved away from the stop 65 as illustrated in Fig. 6. The general condition of the linkage at this period is shown in Fig. 5.

Figure 10:
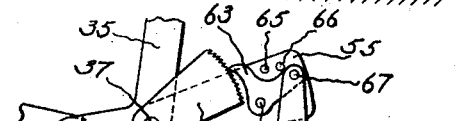
Fig. 10 is an enlarged detail corresponding to Fig. 9.
Figure 12:
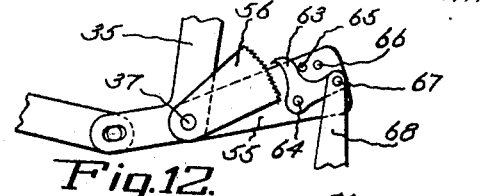
Fig. 12 is an enlarged detail corresponding to Fig. 11.
Figure 9:
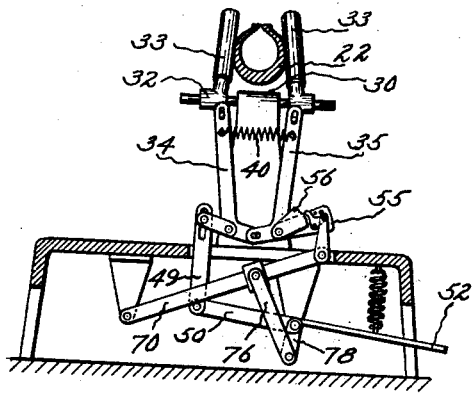
Fig. 9 is a view similar to Fig. 5 illustrating the completion of the bead closing operation.

As the treadle 52 is still further depressed the pawl 63 is rocked until its end engages with the teeth of the ratchet 56, the bead closing members 33 meanwhile remaining in light engagement with the sides of the tire. At a definite point in the upward movement of the link 68 the pawl will be tilted sufficiently to engage the ratchet, this occurring at the time when crank 78 has turned past the center sufficiently to cause a greater rapidity of motion of the link and pawl. The remainder of the downward motion of the treadle brings the parts to the positions of Figs. 9 and 10, in which the beads of the tire have been forced towards each other a predetermined distance. The effect of tires of different cross-sectional diameters on the working of the bead closing apparatus is to cause the ratchet 56 to move freely under the influence of spring 40 a greater or less distance before the pawl contacts with it, the distance the ratchet is moved positively by the pawl always being substantially the same. The tooth of the ratchet in which the pawl engages varies automatically with the tire size, while the bead closing movement is always constant in amount.

Figure 11:
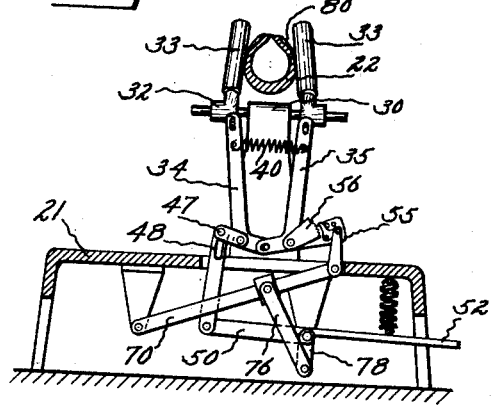
Fig. 11 is a view similar to Fig. 5 showing the initiation of the return of the mechanism to inactive position.

When the treadle is released the wrapping 80 which has meanwhile been applied by the machine retains the beads in closed position, and the tendency of the members 33, as shown in Fig. 11, is to remain in contact with the sides of the wrapped tire. The descent of link 68 continues without effect on the pawl carrier until the pawl 63 strikes the stop 65. After this the pawl carrier moves with the link back to the initial position of Fig. 2. Not until the end of slot 48 comes in contact with stud 47 do the arms 34 carry the members 33 out of contact with the tire sides, this operation being completed concurrently with the return of the pawl carrier to the starting position.

While the various steps have been considered separately and at some length, it will be understood that there is no break in the depression or raising of the treadle. Successive steps follow each other rapidly and purely automatically, no attention on the part of the operator being required to accommodate different sizes of tires. Variations in the mechanical design may be made within wide limits, as I believe the automatic accommodation of any size of tire to be a wholly novel function.

Having thus described my invention, I claim:

1. In a tire wrapping machine, a bead closing mechanism having a pair of tire engaging members movable against opposite sides of the tire, yielding means for urging the members towards the tire, pawl and ratchet mechanism for preventing outward movement of the members, and means for causing the pawl to engage the ratchet and to propel the members towards each other to compress the tire a predetermined amount.

2. In a tire wrapping machine, a bead closing mechanism comprising a pair of tire engaging members, interconnections between said members to cause them to move simultaneously in opposite directions, a spring urging the members toward each other, a ratchet movable with the members, a pawl, and means to move said pawl into engagement with the ratchet and to advance said pawl, a predetermined distance subsequent to such engagement to move the tire engaging members nearer together.

3. In a tire wrapping machine, a bead closing mechanism comprising a pair of tire engaging devices, yielding means tending to close the devices against the tire, and means having a predetermined operative travel for engaging said devices and positively moving them together.

4. In a tire wrapping machine, a bead closing mechanism comprising tire engaging devices mounted for free movement towards the tire for a distance determined by the normal size of the tire, and means for moving said devices a predetermined distance, after the end of the free movement, to compress the tire transversely.

5. In a tire wrapping machine, a bead closing mechanism having tire engaging devices, means to move said devices toward the tire for a distance limited by the normal cross-sectional size of the tire, means to move said devices an additional predetermined distance toward each other and means to prevent separation of said devices during the wrapping operation.

6. In a tire wrapping machine, a bead closing mechanism having a pair of tire engaging devices spring-pressed together, means for holding the devices apart against the action of the spring, means to release said holding means to permit the devices to move into non-compressive engagement with the tire, means to move the devices an additional distance sufficient to substantially close the beads of the tire and means for holding the devices in the latter position during the wrapping operation.

7. In a tire wrapping machine, a bead closing mechanism having tire engaging devices, means to move said devices toward the tire for a distance limited by the normal cross-sectional size of the tire, and means, operative thereafter, to move said devices an additional predetermined distance toward each other.

8. In a tire wrapping machine, a bead closing mechanism having a pair of tire engaging devices, spring-pressed together, means for holding the devices apart against the action of the spring, means to release said holding means to permit the devices to move into non-compressive engagement with the tire, and means to thereafter move the devices an additional distance sufficient to substantially close the beads of the tire.

EDWARD C. TAYLOR.